United States Patent
Ravikumar et al.

(10) Patent No.: US 8,005,824 B2
(45) Date of Patent: *Aug. 23, 2011

(54) ON THE ROLE OF MARKET ECONOMICS IN RANKING SEARCH RESULTS

(75) Inventors: Shanmugasundaram Ravikumar, Cupertino, CA (US); Daniel M. Shiffman, Palo Alto, CA (US); Dandapani Sivakumar, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/193,819

(22) Filed: Aug. 19, 2008

(65) Prior Publication Data

US 2008/0306942 A1     Dec. 11, 2008

Related U.S. Application Data

(63) Continuation of application No. 10/835,989, filed on Apr. 30, 2004, now Pat. No. 7,519,586.

(51) Int. Cl.
*G06F 17/30* (2006.01)
(52) U.S. Cl. .......... 707/722; 707/736; 707/748; 705/37; 705/40
(58) Field of Classification Search .................. 707/736; 705/37
See application file for complete search history.

(56) References Cited

U.S. PATENT DOCUMENTS

| | | | |
|---|---|---|---|
| 6,078,866 A | 6/2000 | Buck et al. | |
| 6,978,263 B2 * | 12/2005 | Soulanille | 1/1 |
| 7,464,079 B2 * | 12/2008 | Soulanille | 1/1 |
| 7,519,586 B2 * | 4/2009 | Ravikumar et al. | 1/1 |
| 7,672,894 B2 * | 3/2010 | Rebane et al. | 705/37 |
| 7,835,943 B2 * | 11/2010 | Cheung et al. | 715/760 |
| 2002/0169760 A1 | 11/2002 | Cheung et al. | |
| 2003/0046098 A1 | 3/2003 | Kim | |
| 2003/0216930 A1 | 11/2003 | Dunham et al. | |
| 2003/0217059 A1 | 11/2003 | Allen et al. | |
| 2005/0060168 A1 | 3/2005 | Murashige et al. | |
| 2005/0096980 A1 | 5/2005 | Koningstein | |
| 2005/0144067 A1 | 6/2005 | Farahat et al. | |
| 2005/0144068 A1 | 6/2005 | Calabria et al. | |
| 2005/0154717 A1 | 7/2005 | Watson et al. | |
| 2005/0256766 A1 | 11/2005 | Garcia et al. | |

* cited by examiner

*Primary Examiner* — Charles Rones
*Assistant Examiner* — Mellissa M Chojnacki
(74) *Attorney, Agent, or Firm* — Gibb I.P. Law Firm, LLC

(57) ABSTRACT

A method of and service for searching computerized networks, such as the internet, that first performs a search based on a user query to produce results that are ranked. The results comprise references to entities (addresses on the network, such as web sites). Before reporting the results to the user, the invention provides that the search entity contacts the entities listed in the search results to determine whether entities listed in the search results desire to change their rank when compared to other entities listed in the results. If some entities do desire to change their rank, the invention charges fees to entities that increase their rank and credits (pays fees) to entities that decrease their rank. A portion of the amount charged to entities that increase their rank can be paid to the entity performing the search (helping to support the high quality search engines), and a portion will go to the entities that voluntarily decrease their rank within the search results (helping to support high-content web sites).

25 Claims, 3 Drawing Sheets

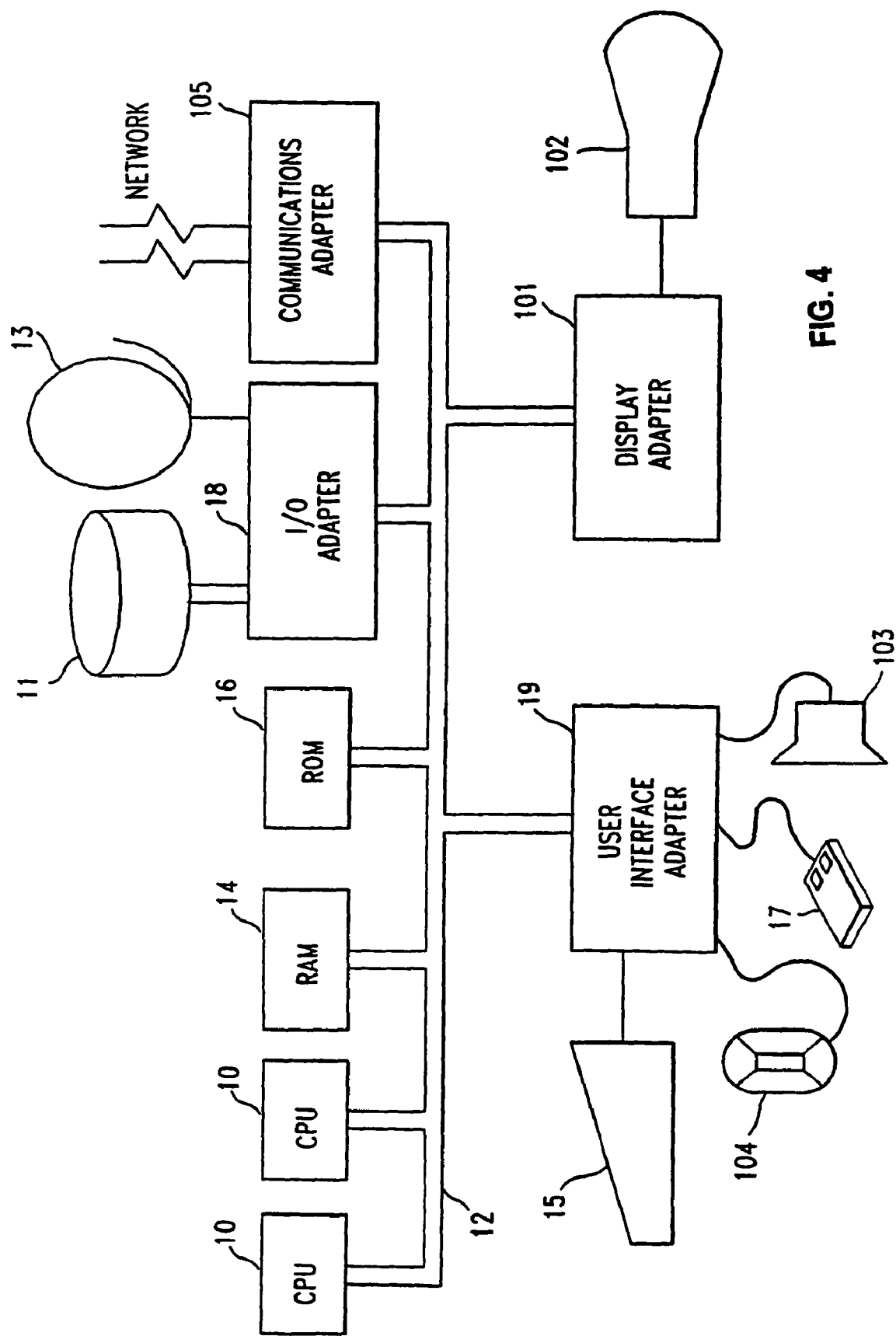

ON THE ROLE OF MARKET ECONOMICS IN RANKING SEARCH RESULTS

CROSS-REFERENCE TO RELATED APPLICATIONS

This application is a Continuation of U.S. application Ser. No. 10/835,989 filed Apr. 30, 2004, the complete disclosure of which, in its entirety, is herein incorporated by reference.

BACKGROUND OF THE INVENTION

1. Field of the Invention

The present invention generally relates to a method of performing a network search (e.g., for web sites) that permits entities in the search results to trade search ranking positions in exchange for monetary payments.

2. Description of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

A widely accepted dictum about Internet content is that "everybody wants it, but nobody wants to pay for it." This is especially true, and quite acutely felt, in the business of web searching. Building a high-quality web search engines is an expensive and formidable proposition for various reasons. These include investments in hardware, software, personnel, maintenance, and especially the need to maintain constant availability and high quality even as web content evolves rapidly in volume (currently major search engine search from among 3.3 billion web pages) as well as variability of formats (HTML, including servlet pages, forms/templates, newsgroups, news feeds, blogs, image/media-rich pages, pages in various languages).

Despite the numerous challenges involved in building a web search engine, it is unclear if this industry can sustain itself profitably in the long run. With end-users not particularly keen on paying for search services, search engine rely on revenue from paid placement, paid inclusion, and targeted advertising to make their profit. The repercussions of this situation are not good news for users of the web: the nearly insurmountable technical and financial barriers that exist for new entrants might lead to lack of competition, and eventually, to compromising the quality of web search. Given that search engine are one of very few ways of bringing order to an otherwise chaotic web, the lack of a thriving search engine industry could ultimately undermine the richness of our web browsing experience.

The invention described below provides a method to infuse a limited form of market economics into the ranking of search results. The invention creates incentives for search engine to build and maintain very high quality ranking methods, and for content creators to build excellent web sites on specific topics. Furthermore, the invention ultimately enhances the quality of the search experience for the users of search engines.

SUMMARY OF THE INVENTION

The invention presents a method of and service for searching computerized networks, such as the internet, that first performs a search based on a user query to produce results that are ranked. These methods are well-known and rank results that are more relevant to the query ahead of less relevant results. The results comprise references to entities (addresses on the network, such as web sites). Before reporting the results to the user, the invention provides that the search entity contacts the entities listed in the search results to determine whether entities listed in the search results desire to change their rank when compared to other entities listed in the results. If some entities do desire to change their rank, the invention charges fees to entities that increase their rank and credits (pays fees) to entities that decrease their rank. A portion of the amount charged to entities that increase their rank can be paid to the entity performing the search (helping to support the high quality search engines), and a portion will go to the entities that voluntarily decrease their rank within the search results (helping to support high-content web sites).

The results are limited in number, so that only entities that are produced by the search are provided an opportunity to change their rank. This keeps the search results high in quality by avoiding paid placement, which can force non-relevant or low quality web sites into the search results. In addition, the invention optimizes the reordering of the entities, so as to minimize the changes that are made to the original rank produced by the search.

These and other aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which:

FIG. 4 is a system diagram illustrating a computer system upon which the invention can be implemented.

DETAILED DESCRIPTION OF PREFERRED EMBODIMENTS OF THE INVENTION

Described below is a method/system where search engine conducts a limited form of trade for the top positions in their search results. In contrast to paid placement, paid inclusion, and targeted advertising, with the inventive methodology, all parties concerned, the search engine companies, users of web search, and content creators on the web, etc. will derive significant benefits. The invention also allows the search engine to reorder search results based on market preferences, while staying close to the original ordering to the extent desirable.

Figures 1, 2:
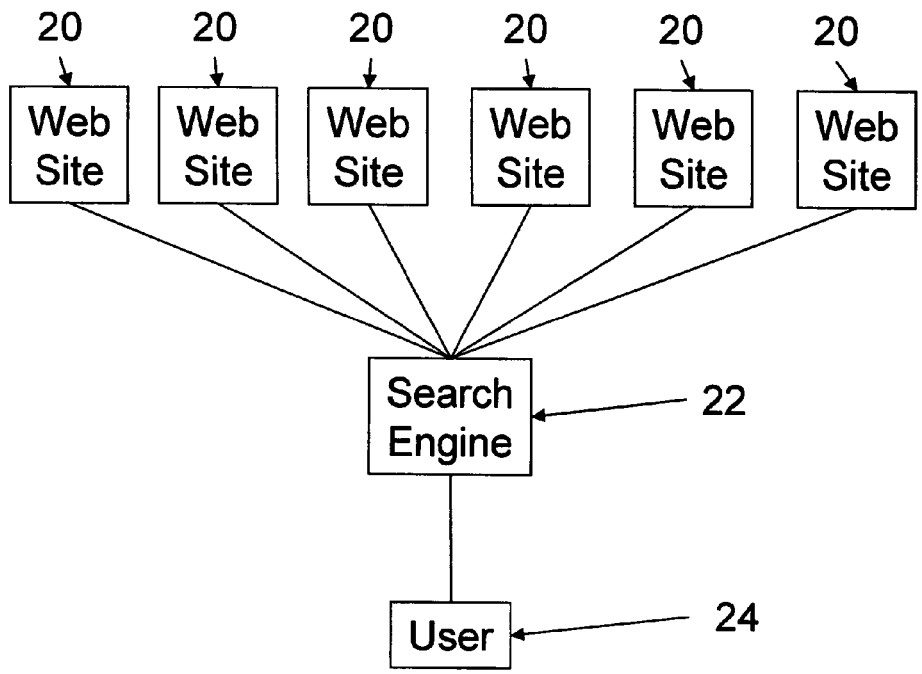
FIG. 1 is a schematic diagram of a computer network system in which the invention would operate.
FIG. 2 is a diagram illustrating the operation of the invention.

As shown in FIGS. 1 and 2, with the invention, a search engine 22 ranks web pages 20 for a given query from a user 24 according to the search engine's 22 internal ranking mechanics, then announces (for each epoch of the mechanism, say, after every crawl) the top k winners, for some parameter k (say, 10). The top 10 winners are shown in the left column of FIG. 2, labeled "Original Search Results." Each interested party among the k winners then conducts a limited form of trade for their positions in the output of the search, and the results are presented in the outcome determined by this trade (until the next epoch). After the trade, FIG. 2 illustrates the "Reordered Search Results" in the right column, where the seventh and tenth ranked web sites are reordered first and second, and where the original first and second ranked web sites are reordered seventh and tenth.

One driving motivation for the invention is that today's search engines employ rather awkward means to maintain a revenue stream. These include paid placement (where the owner of a web site pays the search engine to place their URL near the top of the search results for specific queries), paid inclusion (where the owner of a web site pays the search engine to have their site crawled, possibly to varying degrees of detail), targeted advertising (where the owner of a web site pays the search engine to list their URL alongside the search results for specific queries, often clearly indicating that these are not part of the primary result set).

Some important disadvantages of these conventional schemes are discussed below. First, paid placement suffers from the obvious drawback of resulting in poor quality of search results. As search engine technology evolves, it has become clear that paid placement is extremely unpopular among users. Another serious problem with paid placement is the lack of sovereignty for a good website: no matter how hard it tries to improve its content, and no matter how good it is (even in the view of the ranking method employed by the search engine) it is not guaranteed a top spot.

Targeted advertising overcomes some of the drawbacks of paid placement, but is often annoying or completely ignored. Indeed, the more often a user visits a web site, the more easily the user appears to tune out the auxiliary content surrounding the main portion of the page that is focused on. Examples include target advertising in search engines, portals, templates surrounding online news articles, etc. Targeted advertising also suffers from some technological idiosyncrasies. For example, for the query "cruise control," one of the popular search engines lists advertisements for various companies that offer cruise packages (of the travel-in-a-ship kind) and travel websites.

Paid inclusion seems unattractive to the party that pays the search engine to have their site crawled, only to discover that they are still not in the first page of search results for the most important queries of interest. Some conventional paid inclusion services do not guarantee placement in the top page of the search results, or any favorable position within the search engine database. Therefore, paid inclusion is not completely satisfactory for businesses, and search engines have recognized and acknowledged this.

Additionally, there are some further drawbacks to the current setup of search engine economics. Some of the most highly rated web sites for various queries turn out to be built and maintained by non-profit, grassroots organizations. Another category of websites often rated highly are "hub pages" [2], which are hand-picked collections of hyperlinks to good pages on some topic. While the creators of this content have put in tremendous amount of work in creating excellent sites that offer information, analysis, and more, they derive no ostensible financial benefit from their efforts. Similarly, a for-profit business that gets listed highly for some query might still covet a higher position, and be willing to pay for it, but the present setup offers no room to tap this source of revenue. Finally, as mentioned earlier, search engines 22 spend extensive resources and innovation in creating good ranking methods that satisfy the often-conflicting requirements of high accuracy (precision and recall), low-spam, quick responses, etc. While the businesses that are listed in the top few positions for popular queries derive obvious and non-trivial financial gains from the listings, the search engine company itself is not a direct beneficiary of any of these gains.

Therefore, the invention provides a system where those in the top k results are allowed to trade positions in exchange for monetary payment. In one example, let Q be some query from the user 24, and let k be some parameter, chosen by the search engine 22 for the query Q. Think of k=30 for a typical query with today's search engines 22. Time is divided into epochs, where within each epoch the search results for query Q will be the same. A convenient way to think of an epoch is as a crawl/index cycle, the time between two successive updates of the index in a way that affects the top k results for query Q. At the beginning of the epoch, the search engine 22 publishes the top k results for query Q, and invites the (owners of the) websites 20 in this list to participate in a trade of their position in this list. A website w of rank r then turns in a non-increasing sequence of k integers, $U_w(1) \geq \ldots \geq U_w(r) \geq \ldots \geq U_w(k)$, where $U_w(i)$ denotes w's utility of being listed at position i. Thus for i<r, $U_w(i)-U_w(r)$ denotes the additional utility derived by w by being listed at position i instead of position r, and is interpreted as how much w is willing to pay to be at position i. For r>i, $U_w(r)-U_w(i)$ denotes w's utility loss in being ranked i instead of r, and is interpreted as how much w is willing to accept to be at position i. The utilities are a rough measure of how much inherent value website w places in being at various positions of the search for query Q.

Once all the utilities are available, the search engine 22 computes a reordering of the top k results, along with corresponding payoff values for each website (as shown in FIG. 2). For website w whose initial rank is r and final rank is r', the payoff p(w) must satisfy $p(w) < U_w(r') - U_w(r)$ if r'<r, and $p(w) > U_w(r) - U_w(r')$ if r'>r. Websites w whose rank improves pay the search engine 22 the value p(w), and websites w whose rank became worse receive a payment of p(w) from the search engine 22.

A reordering along with a payoff sequence is said to be feasible if the total payments by the search engine 22 do not exceed the total payments to the search engine 22, and is said to be balanced if they are equal. In the case of feasible, non-balanced payoffs, the excess payments made to the search engine 22 become profit for the search engine 22.

One salient feature of the invention is its immunity to spam. With the invention, a web page that did not receive a rank of k or better simply does not get to participate in the trade for top positions. If the search engine 22 does not produce poor quality (spam) pages in the top k, the invention guarantees that the user will never see one of these pages in the search screen (unlike paid placement or targeted advertising). This significantly enhances the search/browsing experience for the user 24. Equivalently, the search engine 22 can guarantee spam-proofness in the results without having to forego a source of revenue.

Further, the invention provides sovereignty by allowing a website to maintain its (earned) rank for a query. Namely, if website w has rank r, simply letting $Uw(i)=-\infty$ for i>r ensures that no reordering will assign w a rank worse than r. Note that it can still aspire to improve its rank by trading for a higher place. (In practice, $-\infty$ will be replaced by a negative value that is larger in magnitude than the largest of all finite utilities of all websites at position r). Secondly, a website has complete control of what it can do to improve its search rank. In other words, the invention does not deny a website the opportunity to maintain/enhance its rank by improving its content and/or relevance to the query. Thus, even if a business does not have the monetary strength to buy a higher spot, it can achieve the same effect by improving the quality of their website.

Further, the invention can be incrementally deployed. Since the invention provides a per-query trade, it allows for easy and incremental deployment. Namely, search engines 22 can try pilot projects where they deploy the scheme for a small number (e.g., 1000) of popular queries. This will give insight into how users 24 react to the trading of search result positions, and into how effective a revenue source this turns out to be. It is also quite easy to turn off the mechanism by simply reverting to the original rankings. Another mode to deploy the invention is to offer the default search with reorderings, and offer a paid premium service for access to the original rankings. The scheme is also incremental in a different sense. Namely, by choosing different values of k, the search engine 22 can control the size of the pool of participants 20 in the trade. More participants likely will mean more revenue, but could also mean that the results could be more drastically reordered. Yet another notion of incrementality is with respect to time. Different businesses can opt to trade for higher spots at different times of the year, depending on their business cycles.

The invention also provides anonymous trading. With the invention, after a website w submits its utility values, it has no control over which website from the top k list might usurp it in the rankings. Specifically, it might be the case that a website ends up selling its position to a competitor ranked below it. The invention can also allow other forms of trade that are not anonymous, where a website allows/disallows specific trades with its competitors.

Search engines 22 are one beneficiary of the invention. By charging a modest fee for each participant of the trade, or by producing a non-balanced feasible reordering/payoff, search engines 22 can create a new source of revenue. This revenue source comes at near-zero additional cost, since the invention depends only on the ranking that the search engine 22 already produces. In addition, creators of content have the option of translating the effort involved in creating and maintaining good websites into suitable financial reward. For example, it is conceivable that a large corporation, whose rank for a query is below the top 10, might be interested in acquiring one of the top spots held by several non-profit user groups. Such a trade naturally benefits both parties.

Thus, with the invention, a business that maintains a top k web site on some topic now has the opportunity to improve their ranking in the search results by making suitable payments. This is a significantly better situation than any of the present schemes, namely targeted advertising, paid placement, and inclusion. With targeted advertising, businesses run the risk of users 24 "tuning out" due to "ad fatigue"; with paid placement, search engines 22 run the risk of losing patronage in the long run, and consequently, the businesses that pay to be placed do not reach the intended market.

Finally, users 24 of search engines 22 stand to benefit in some obvious and some subtle ways. As mentioned earlier, there is no significant compromise of quality of search, since the trade is limited to the websites 20 that are already deemed good by the search engine 22. Furthermore, the absence of paid placements and targeted advertisements, together with the "top k quality assurance" from the search engine 22, implies that seasonal promotions from businesses that appear on the top spots might be significantly beneficial to many users 24. In the presence of a trading mechanism among the top k winners, several high-quality web pages 20 will emerge on specific topics, created purely with the intent of participating in the trade for financial gains. Currently, there is significant incentive to be placed in the top 10 search results for a query, but not beyond that (say, top 30). With the inventive trading mechanism, content creators will strive for a good ranking, even if it is not a top 10 spot. This, of course, translates into well-maintained, well-updated web pages 20 of high informational value to users 24.

With the invention, it is in the interests of search engines to be able to open the trade for large values of k; on the other hand, they must ensure that these k pages are of high quality. This will promote the development of robust ranking methods that are resistant to spam. A fringe benefit of the invention is that it can be used to eliminate clutter in the search results page that is caused by search results and paid placement/targeted advertisements competing for the limited real estate (screen space). With a inventive trading scheme in place, it is also possible for search engines to develop creative layouts of search results where 10-20 search results are presented in various sizes, fonts, colors, etc. (for example, simulating the look-and-feel of a newspaper).

Although this disclosure introduces an economic angle to ranking web search results, the invention is primarily a search and ranking problem. As will be shown, the inventive formulation of what constitutes the best reordering of search results, as well as some technical proposals, are closely tied to the semantics of web search.

More specifically for example, let k be a positive integer, and let [k] denote the set $\{1, \ldots, k\}$. We will identify the set of top k pages (for some query) with the set [k], and also identify the set of top k positions with the set [k]. Let $\sigma$ be a permutation on [k], so that for $v \in [k]$, $\sigma(v)$ denotes the position assigned to the page v. For $v \in [k]$, let $U_v:[k] \to \Re$ denote the utility functions of the top k pages. We interpret $U_v(i)$ as the inherent value that the owner of web page v places on being ranked i. For each v, the utility function $U_v$ satisfies the monotonicity condition $U_v(1) \geq \ldots \geq U_v(k)$. This is entirely natural since we expect websites to place a higher value on being ranked higher. Let $r = \sigma(v)$. Thus for $i < r$, $U_v(i) - U_v(r)$ denotes the additional utility derived by v by being listed at position i instead of position r, and is interpreted as how much v is willing to pay to be at position i. For $r > i$, $U_v(r) - U_v(i)$ denotes w's utility loss in being ranked i instead of r, and is interpreted as how much v is willing to accept to be at position i.

Given $\sigma, U_1, \ldots, U_k$, the problem is to compute a permutation $\pi$ on [k], along with a payoff function $p: [k] \to \Re^+$. The payoff function must satisfy the following condition: for each $v \in [k]$, for which $\sigma(v) = r$ and $\pi r(v) = r'$, we require $$p(v) < U_v(r') - U_v(r) \text{ if } r' < r$$

$$p(v) > U_v(r) - U_v(r') \text{ if } r' > r.$$

The payoff function will be used as follows: websites v whose rank improves ($\pi(v) < \sigma(v)$) pay the search engine the value $p(v)$, and websites v whose rank became worse $\pi(v) > \sigma(v)$) receive a payment of $p(v)$ from the search engine. The conditions on $p(\cdot)$, therefore, imply that the reordering is acceptable the websites with respect to their utility functions. Given $\sigma, U_1, \ldots, U_k$, a reordering $\pi$ with a payoff function p is said to be feasible if $$\sum_{v: \pi(v) > \sigma(v)} p(v) \leq \sum_{v: \pi(v) < \sigma(v)} p(v).$$

In other words, the total payments by the search engine do not exceed the total payments to the search engine. We say that (π, p) is balanced if we have equality in the above. In the case of feasible, non-balanced payoffs, the excess payments made to the search engine become profit for the search engine.

We now develop two notions of what constitutes a good reordering of search results in the context of the utility functions submitted by websites. The first notion arises from an economic viewpoint, and is similar to the Gale-Shapley stable marriage criterion. Namely, we will say that a reordering π is stable with respect to $U_1, \ldots, U_k$ if there is no pair v,w of websites such that $$\pi(v) < \pi(w) \text{ and} \quad \text{i.}$$

$$U_v(\pi(v))(v)) - U_v(\pi(w)) < U_w(\pi(v)) - U_w((w)). \quad (1)$$

In other words, a stable reordering does not leave any pair of websites v,w such that swapping their respective positions is strictly beneficial to both. Notice that if $\pi(v) < \pi(w)$ but $U_v(\pi(v)) - U_v(\pi(w)) < U_w(\pi(v)) - U_w(\pi(w))$, then v and w could exchange their positions, with w effectively paying v the amount $$\frac{1}{2}[U_w(\pi(v)) - U_w(\pi(w)) + U_v(\pi(v)) - U_v(\pi(w))],$$

which is the average of w's gain in utility and v's loss in utility that results from the swap. When this swap is made with the above payoff, then w's new net utility is $$U_w(\pi(v)) - \frac{1}{2}[U_w(\pi(v)) - U_w\pi(w)) + U_v(\pi(v)) - U_v(\pi(w))] =$$

$$\frac{U_w(\pi(v)) + U_w(\pi(w))}{2} + \frac{U_v(\pi(v)) - U_v(\pi(w))}{2} \geq$$

$$\frac{U_w(\pi(v)) + U_w(\pi(w))}{2} \rangle U_w(\pi(w)).$$

The last step uses the assumption $U_w(\pi(v)) - U_w(\pi(w)) > U_v(\pi(v)) - U_v(\pi(w)) \geq 0$, so $U_w(v))/2 > U_v(\pi(w))/2$.

Similarly, it can be seen that the new net utility for v is also strictly improved. To summarize, a stable reordering is one where no pair of websites has any incentive to trade places. Notice that the definition of stability makes no mention of the original ordering σ produced by the search engine; thus, it is a purely economic notion. Our next goal is to tie this to the context of ranking search results, and this leads to the following question: given $U_1, \ldots, U_k$ and an initial ordering σ, what is the best one among all stable reorderings?

Intuitively, we would like to say that π is the best stable reordering if, for any other stable π',π, is in some sense superior to π'. (Readers familiar with the stable marriage problem will recall that in the stable marriage setting, a matching is said to be boy-optimal if there is no other stable marriage in which some boy is paired up with a girl strictly higher in his ranking). In our context of ranking search results, we take the view that π is superior to π' if π is "closer" to σ than π' is. To formalize this idea, we will use the notion of Kendall tau distance between orderings. Note that any other distance measure, e.g., the Spearman footrule metric, would work just as well.

For orderings σ and π on some universe, the Kendall tau distance between σ and π, denoted by $K(\sigma,\pi)$, is defined to be the number of pairs of elements of the universe such that σ and π disagree on their relative ordering; that is, the number of pairs (v,w) such that either $\sigma(v) < \sigma(w)$ and $\pi(v) > \pi(w)$ or $\sigma(v) > \sigma(w)$ and $\pi(v) < \pi(w)$. The Spearman footrule distance between σ and π is defined as $$\sum_v |\sigma(v) - \pi(v)|.$$

We say that an ordering π that is stable with respect to $U_1, \ldots, U_k$ is optimal with respect to a if, for any other ordering π' that is stable with respect to $U_1, \ldots, U_k$, we have $K(\sigma,\pi) < K(\sigma,\pi')$.

Naturally, it is possible to define optimality in other ways. For example, one could define the optimality of reordering together with a payoff function in terms of how much revenue the search engine derives by that reordering/payoff. Our definition suggests that it is best to modify the original ordering σ produced by the search engine as little as possible, still incorporating some measure of market economics. Thus, one may think of an optimal stable ordering as a principled way to achieve a balance between unadulterated ranking of search results and pure paid placement.

Before we discuss methods that produce good reorderings, we note that given σ, $U_1, \ldots, U_k$, and a reordering π, it is possible to check if there is some payoff function p such that π and p form a feasible reordering of σ, $U_1, \ldots, U_k$. Define the two sets $$D = \{v | U_v(\pi(v)) < U_v(\sigma(v))\}$$

And $$S = \{v | U_v(\pi(v)) > U_v(\sigma(v))\},$$

And the quantities $$\text{DEFICIT} = \sum_{v \in D} (U_v(\sigma(v)) - U_V(\pi(v)))$$

And $$\text{SURPLUS} = \sum_{v \in S} (U_v(\pi(v)) - U_V(\sigma(v))).$$

It is easy to see that if SURPLUS ≧ DEFICIT, then π is a feasible reordering, with the payoffs defined as follows. The payoff to v is $U_v(\sigma(v)) - U_v(\pi(v))$ if v ∈ D and the payoff by v is $U_v(\pi(v)) - U_v(\sigma(v))$ if v ∈ S. The excess SURPLUS−DEFICIT goes to the search engine. The main methodic question is to find reorderings that can be guaranteed to be feasible (with some payoff function). We observe next that a natural class of methods has the property that every reordering produced is feasible. Suppose we start from σ and make a sequence of viable swaps, namely if π is our current ordering, we swap some pair of elements v and w that are in violation of the stability condition (that is, v and w satisfy (1)). Then it is easy to see that the resulting reordering is always feasible. To make further swaps, we suitably modify the utility functions to reflect the payoff made for the swap of v and w. (In economic literature, the difference of utility and cost, or the sum of the utility and extra payments, is called the welfare.)

One of our methods outlined below is based on viable swaps, hence by the above observation; we are guaranteed to produce feasible reorderings. Before we describe our method, note that to achieve stability and feasibility simultaneously, there is a straightforward method. Namely, while the current ordering is not stable, pick a pair (v,w) that form a viable swap, and perform the swap. Since the total net utility (welfare) of all websites strictly improves with each swap, and since the set of orderings on k elements is finite, this method is guaranteed to produce a stable feasible reordering.

Our first method is aimed at producing stable reorderings that are close to the original ordering, and takes time polynomial in the sum of all utilities. The second method aims at producing a feasible reordering by a computationally tractable approach (time polynomial in k), while sacrificing stability. This method also offers the search engine the flexibility of choosing how much influence from market forces it will incorporate into its search results.

It is an open question to find an method that produces a stable reordering in time polynomial in k; another open question is to find a polynomial (in k) time method to produce an stable ordering that is optimal with respect to the initial ordering σ. We believe that the first problem has a polynomial time method, while the second one is NP-hard. Another interesting directions to explore is to consider truthful mechanisms, namely the question of which reordering mechanisms ensure that the utilities are reported truthfully.

Our first method is aimed at achieving small Kendall distance between the initial ordering σ and the final ordering π, while ensuring stability. Initialize π:=σ. In each round of the method, we define a weighted graph G on k vertices, based on the current ordering π, as follows. An (undirected) edge is placed between nodes v and w if they satisfy Equation (1). (Again, these are with respect to the current net utilities of each web site, and encompass information about the payoffs from the previous rounds). The weight of this edge is the improvement in net utility for v and w. We find a maximum weight matching on the nodes of this graph, that is, a node-disjoint set of edges of maximum total weight, and for each edge (v,w) in the matching, we swap v and w. This gives the updated ordering π, which is then used for the next round. The process stops when the graph G has no edges. Note that each edge in the graph G (at any round) constitutes a viable swap; therefore, the resulting ordering is feasible. Since the method terminates when G is empty, it follows that the resulting ordering π has no pair (v,w) that is in violation of stability. Therefore, the method produces a stable and feasible reordering. In each round of the method, the sum of net utilities of all websites in their current positions increases by at least 1. Therefore, the number of rounds in the method is bounded by $$\sum_v U_v(1),$$

and each round takes time polynomial in k and the sum of the utilities. The above version of the method makes no attempt to produce near-optimal solutions, that is, it makes no effort to produce a reordering a with small Kendall tau distance to σ. We now point out a heuristic that aims to reduce the Kendall tau distance to σ. In creating the graph G described above, the weight on the edge (v,w) will be a function of both the improvement in the net utility for v and w that results from swapping them and the value |σ(v)−σ(w)|. Specifically, if v and w are positioned far apart in σ, then the benefit of swapping them should be reduced. This ensures that the Spearman footrule distance between σ and π (that is, $$\sum_v |\pi(v) - \sigma(v)|)$$

is low, which, via an inequality of Diaconis and Graham [1], will ensure that K(π,σ) is small as well.

Our second method is aimed at achieving computational tractability. The approach we take here is to linearly order the web sites by their "buying power," based on the information available in the utility functions, and the initial ordering σ of the search results. Once a single linear ordering of the web sites is achieved, and that ordering reflects their eligibility for various positions based on their financial strength, the idea is to aggregate this ranking with the original ordering σ produced by the search engine, to obtain the final ordering. Given σ and the utility functions $U_1, \ldots, U_k$, define a bipartite graph whose nodes are the k web sites on one side, positions 1 through k on the other side. The edges of the graph carry costs, where cost of assigning web site v to position i is defined to be $U_v(\sigma(v))-U_v(i)$. Thus for i>σ(v), the cost is non-negative and for i<σ(v), the cost is non-positive. If we then find a minimum cost perfect matching (a 1-1, onto, pairing of nodes) in this graph, that yields a linear order among the web sites, one that minimizes the total loss in utility of displacing web sites from their original positions σ. Note, that this does not guarantee that the utility loss is minimized for any one web site, but only for the system as a whole. Let τ denote the order thus obtained. Note, that the trivial solution τ=a ensures that the total utility loss is zero (with respect to σ), so that the total utility loss produced by τ is always non-positive (that is, the net utility of the system is non-negative). In other words, τ is a feasible reordering. Now we have two rankings σ and τ of the web sites that were present in the top k results of the search engine for the query of interest. The original ordering σ is best from the search perspective, while τ offers a feasible solution that incorporates utility information. The final step is to aggregate these two orderings to arrive at a final order. A desirable aggregation in this context is to produce a ranking π that minimizes the weighted total Spearman footrule distance to σ and τ, namely, the quantity $W_1 F(\sigma, \pi)+W_2 F(\tau,\pi)$, where $W_1$ and $W_2$ are weights in the interval [0, 1] so that $W_1+W_2=1$. The weights could be chosen to either make π close to τ, thus keeping the final ordering close in spirit to the original, or to make π close to σ, thus making the final ordering take into account the competition for various positions that arise from the market. The advantage of using the Spearman footrule distance here is that the aggregation problem can be solved in polynomial time. We know that with $W_1=0$ and $W_2=1$, we are guaranteed a feasible reordering; therefore, the natural suggestion is to find the smallest $W_2$ such that the reordering is still feasible. This addresses our original goal of producing a feasible reordering that is close to the original ordering σ.

Figure 3:
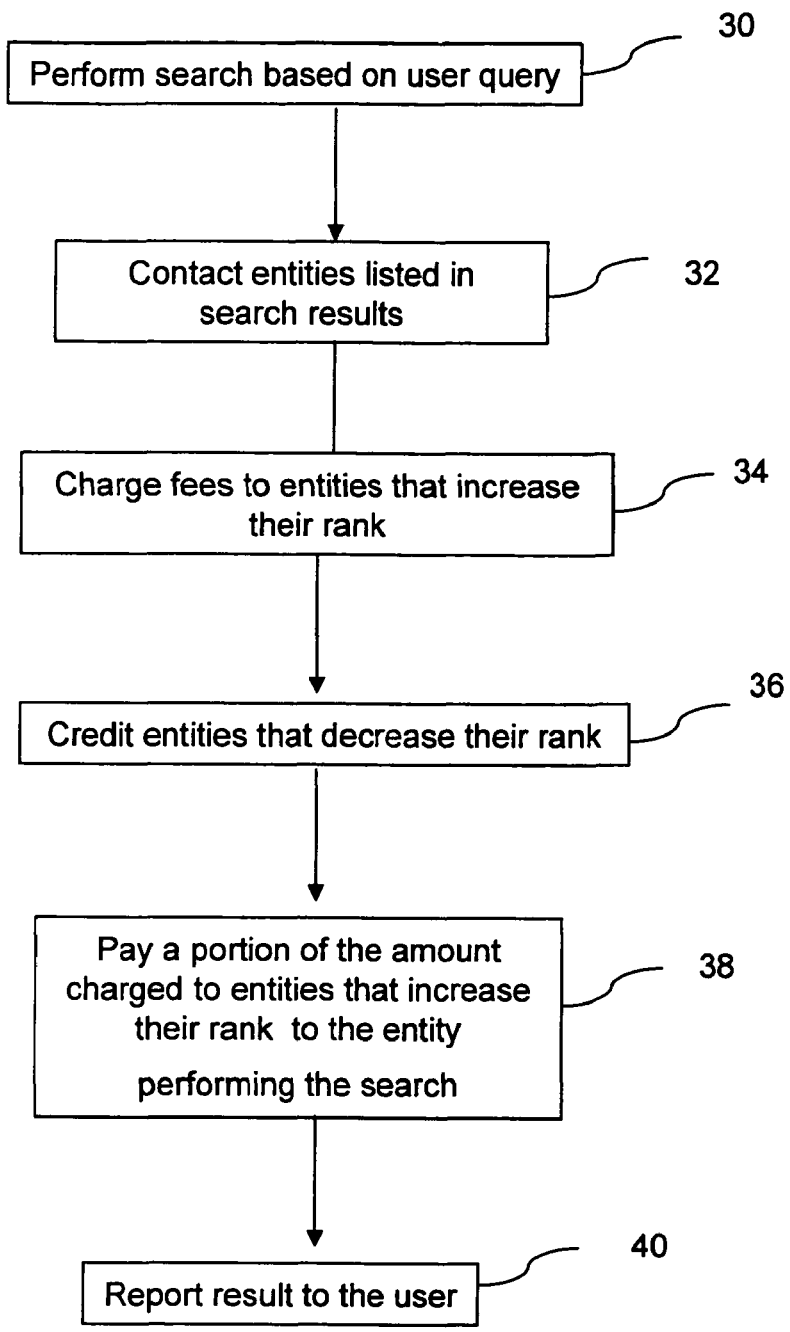
FIG. 3 is a flowchart illustrating the operation of the invention.

Therefore, as shown above, and as shown in flowchart form in FIG. 3, the invention presents a method of searching computerized networks, such as the internet, that first performs a search based on a user query 30 to produce results that are ranked. These methods are well-known and rank results that are more relevant to the query ahead of less relevant results. The results comprise references to entities (addresses on the network, such as web sites). Before reporting the results to the user 40, the invention provides that the search entity contacts the entities listed in the search results 32 to determine whether entities listed in the search results desire to change their rank when compared to other entities listed in the results. If some entities do desire to change their rank, the invention charges fees to entities that increase their rank 34 and credits (pays fees) entities that decrease their rank 36. A portion of the amount charged to entities that increase their rank can be paid to the entity performing the search 38 (helping to support the high quality search engines), and a portion will go to the entities that voluntarily decrease their rank within the search results 36 (helping to support high-content web sites).

A representative hardware environment for practicing the present invention is depicted in FIG. 4, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate the invention also loaded onto the computer system.

As discussed above, the results are limited in number, so that only entities that are produced by the search are provided an opportunity to change their rank. This keeps the search results high in quality by avoiding paid placement, which can force non-relevant or low quality web sites into the search results. In addition, the invention optimizes the reordering of the entities, so as to minimize the changes that are made to the original rank produced by the search.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

While the invention has been described in terms of preferred embodiments, those skilled in the art will recognize that the invention can be practiced with modification within the spirit and scope of the appended claims.

REFERENCES

[1] P. Diaconis and R. Graham, "Spearman's Footrule As a Measure of Disarray", Journal of the Royal Statistical Society, Series B, 39(2):262-268, 1977.
[2] J. M. Kleinberg, "Authoritative Sources In A Hyperlinked Environment", Journal of the ACM, 46(5):604-632, 1999.

What is claimed is:

1. A computer-implemented method of searching comprising:
   receiving, at a computing device, a user query from a user;
   after receiving said user query, performing a search, by said computing device, based on said user query to produce search results that are ranked, wherein each of said search results comprises a reference to an entity;
   contacting, by said computing device, said entity to determine whether said entity desires to change a rank of a corresponding search result in said search results;
   changing said rank of said corresponding search result by trading a ranking between a first search result rank of a first entity with a second higher search result rank of a second entity;
   charging, by said computing device, entities said entity that changes said rank of said corresponding search result to increase said rank in said search results: and
   after charging said entity and changing said rank of said corresponding search result, reporting said search results with changed rankings to said user.

2. The method according to claim 1, wherein said results are limited in number, such that only entities that are produced by said search are provided an opportunity to change said rank of said corresponding search result.

3. The method according to claim 1, further comprising optimizing reordering of said entities, wherein said optimizing minimizes changing an original rank produced during said search.

4. The method according to claim 1, wherein said entity maintains a Web site corresponding to at least one search result.

5. A computer-implemented method of searching comprising:
   performing, by a computing device, a search based on a user query to produce ranked search results, wherein each of said ranked search results comprises a reference to an entity; and
   after said performing said search and before reporting said ranked search results to said user,
   contacting, by said computing device, said entity and determining said entity's desire to change a corresponding search result rank in said ranked search results;
   changing said rank of said corresponding search result by trading a ranking between a first search result rank of a first entity with a second higher search result rank of a second entity; and
   charging, by said computing device, said entity that increase said corresponding search result rank.

6. The method according to claim 5, wherein said ranked search results are limited in number, such that only entities that are produced by said search are provided an opportunity to one of increase and decrease said corresponding search result rank.

7. The method according to claim 5, further comprising optimizing reordering of said entities, wherein said optimizing minimizes changing an original rank produced during said search.

8. The method according to claim 5, wherein said entity maintains a Web site corresponding to at least one search result.

9. A computer-implemented method of searching comprising:
   receiving, by a computing device, a user query from a user;
   after receiving said user query, performing a search, by said computing device, based on said user query to produce ranked search results, wherein each of said ranked search results comprises a reference to an entity;
   contacting, by said computing device, said entity and determining said entity's desire to change a corresponding search result rank in said ranked search results;

changing said rank of said corresponding search result by trading a ranking between a first search result rank of a first entity with a second higher search result rank of a second entity;

charging, by said computing device, said entity that increase said corresponding search result rank, wherein at least a portion of the amount charged to said entity that increase said corresponding search result rank is paid to a second entity that decrease a corresponding search result rank;

crediting entities that decrease said corresponding search result rank; and after charging said entities that increase said corresponding search result rank, crediting said entities that decrease said corresponding search result rank, and changing search result rankings of said search results, reporting said search results with changed search result rankings to said user.

10. The method according to claim 9, wherein at least a portion of the amount charged to entities that increase said corresponding search result rank is paid to an entity performing said search.

11. The method according to claim 9, wherein said results are limited in number, such that only entities that are produced by said search are provided an opportunity to change said rank of said corresponding search result.

12. The method according to claim 9, further comprising optimizing reordering of said entities, wherein said optimizing minimizes changing an original rank produced during said search.

13. The method according to claim 9, wherein said entity maintains a Web site corresponding to at least one search result.

14. A computer-implemented method of performing an internet search comprising:

inputting, by a computing device, a user query from a user;

after said inputting of said user query, performing a search, by said computing device, based on said user query to produce ranked search results, wherein each of said ranked search results comprise references to web sites;

contacting, by said computing device, said websites to determine whether a web site in said results desire to change said corresponding search result rank in said ranked search results;

changing said rank of said corresponding search result by trading a ranking between a first search result rank of a first entity with a second higher search result rank of a second entity;

charging web sites that increase said corresponding search result rank; and after charging said web sites and changing rankings of said ranked search results, reporting said ranked search results with changed search rankings to said user.

15. The method according to claim 14, wherein said results are limited in number, such that only web sites that are produced by said search are provided an opportunity to change said rank of said corresponding search result.

16. The method according to claim 14, further comprising optimizing reordering of said web sites, wherein said optimizing minimizes changing an original rank produced during said search.

17. The method according to claim 14, further comprising, after reordering said ranked search results, displaying reordered ranked search results to said user.

18. A non-transitory program storage device readable by machine, tangibly embodying a program of instructions executable by the machine to perform a method of searching comprising:

receiving a user query from a user; after receiving said user query, performing a search based on said user query to produce search results that are ranked, wherein each of said search results comprises a reference to an entity;

contacting said entity to determine whether said entity desires to change a rank of a corresponding search result in said search results;

changing said rank of said corresponding search result by trading a ranking between a first search result rank of a first entity with a second higher search result rank of a second entity;

charging said entity that changes said rank of said corresponding search result to increase said rank in said search results; and after charging said entity and changing said rank of said corresponding search result, reporting said search results with changed rankings to said user.

19. The program storage device according to claim 18, wherein said results are limited in number, such that only entities that are produced by said search are provided an opportunity to change said rank of said corresponding search result.

20. The program storage device according to claim 18, wherein said method further comprises optimizing reordering of said entities, wherein said optimizing minimizes changing an original rank produced during said search.

21. The program storage device according to claim 18, wherein said entity maintains a Web site corresponding to at least one search result.

22. A service for searching comprising:

receiving a user query from a user; after receiving said user query, performing a search based on said user query to produce search results that are ranked, wherein each of said search results comprises a reference to an entity;

contacting said entity to determine whether said entity desires to change a rank of a corresponding search result in said search results;

changing said rank of said corresponding search result by trading a ranking between a first search result rank of a first entity with a second higher search result rank of a second entity;

charging said entity that changes said rank of said corresponding search result to increase said rank in said search results; and after charging said entity and changing said rank of said corresponding search result, reporting said search results with changed rankings to said user.

23. The service according to claim 22, wherein said results are limited in number, such that only entities that are produced by said search are provided an opportunity to change said rank of said corresponding search result.

24. The service according to claim 22, further comprising optimizing reordering of said entities, wherein said optimizing minimizes changing an original rank produced during said search.

25. The service according to claim 22, wherein said entity maintains a Web site corresponding to at least one search result.

* * * * *